April 17, 1962 L. A. WILKINS ET AL 3,029,684
CAMERA-PROJECTOR APPARATUS
Original Filed June 22, 1953 10 Sheets-Sheet 1

INVENTORS,
LOWELL A. WILKINS,
HENRY S. KANE, DECEASED,
FLORENCE KANE, ADMINISTRATRIX

BY
ATTORNEYS

April 17, 1962  L. A. WILKINS ET AL  3,029,684
CAMERA-PROJECTOR APPARATUS
Original Filed June 22, 1953  10 Sheets-Sheet 3

INVENTORS,
LOWELL A. WILKINS,
HENRY S. KANE, DECEASED,
FLORENCE KANE, ADMINISTRATRIX

ATTORNEYS

April 17, 1962  L. A. WILKINS ET AL  3,029,684
CAMERA-PROJECTOR APPARATUS
Original Filed June 22, 1953  10 Sheets-Sheet 4

INVENTORS,
LOWELL A. WILKINS,
HENRY S. KANE, DECEASED,
FLORENCE KANE, ADMINISTRATRIX
BY
ATTORNEYS

April 17, 1962    L. A. WILKINS ET AL    3,029,684
CAMERA-PROJECTOR APPARATUS
Original Filed June 22, 1953    10 Sheets-Sheet 5

INVENTORS,

LOWELL A. WILKINS,
HENRY S. KANE, DECEASED,
FLORENCE KANE, ADMINISTRATRIX

BY

ATTORNEYS

INVENTORS,
LOWELL A. WILKINS,
HENRY S. KANE, DECEASED,
FLORENCE KANE, ADMINISTRATRIX
BY
ATTORNEYS

INVENTORS,
LOWELL A. WILKINS,
HENRY S. KANE, DECEASED,
FLORENCE KANE, ADMINISTRATRIX

United States Patent Office 3,029,684
Patented Apr. 17, 1962

3,029,684
CAMERA-PROJECTOR APPARATUS
Lowell A. Wilkins, 440 Webster, Chicago, Ill., and Henry S. Kane, 540 Aldine, Chicago, Ill.; Florence Kane administratrix of said Henry S. Kane, deceased
Original application June 22, 1953, Ser. No. 363,024. Divided and this application Apr. 20, 1959, Ser. No. 815,765
14 Claims. (Cl. 88—16.2)

This application is a division of our parent application Serial No. 363,024, filed June 22, 1953, now U.S. Patent No. 2,910,911.

This invention relates generally to photographic equipment and more particularly relates to improvements in apparatus provided for taking and projecting motion pictures.

According to the general principles of the present invention, a combination camera-projector apparatus is provided which includes a projector casing having circuit means therein including an amplifier circuit means adapted to transmit an amplified signal voltage to a loud speaker unit. The projector unit is further provided with an electric drive motor having a rotatable power take off shaft which extends outwardly of the projector casing at one side thereof. The projector casing is further provided with an electric light source means arranged to emit rays of light outwardly of the projector casing.

On the one face of the projector casing, means are provided affording a recess complementary in shape to a camera unit, thereby facilitating reception of the camera unit in removable assembly with the projector casing. The camera unit includes a camera casing provided with a separate amplifier circuit means as well as with a turret type lens apparatus including a camera lens and a projection lens.

Adjacent the lens apparatus of the camera is provided an intermittent rotatable shutter means and there is further provided in the camera casing a separate electric motor having a drive connection with the shutter means as well as with a film transporting means adapted to move a motion picture film through the camera unit.

An adjustable mirror is carried in the camera casing and may be adjusted to selectively register with a lens means and with the light source in the projector so as to transmit light from the light source through the lens means.

The film transporting means in the camera casing not only move the film with respect to the lens means, but include an electromagnetic transducer head which establishes a magnetic field through which a magnetic sound track on the film may be moved.

The circuit means in the camera casing include terminal connections on the camera casing to transmit an intelligence signal through the camera amplifier circuit means and to the transducer head for recording the signal on the film sound track.

A terminal block is also provided on the camera casing and includes terminal connections to transmit electrical energy from an outside source to the motor and to the circuit means in the camera casing. Whenever the camera is used apart from the projector, a battery may be carried by the operator to operate as the source of electrical energy.

The driving connection between the electric motor in the camera casing and the film transporting means and the shutter means comprises an overriding clutch and also includes means to concurrently inactivate the motor in the camera casing while effecting a driving connection between the power take off shaft on the motor in the projector casing and the movable components in the camera casing.

The projector casing is further provided with a terminal block in register with the terminal block on the camera casing and intermating terminal connections are provided in the terminal blocks to transmit a recorded signal from the transducer head through the amplifier means in the camera casing and thence to the amplifier means in the projector casing, whereby the recorded signal will be preamplified in a staging arrangement.

It is an object of the present invention to provide a camera-projector apparatus equipped with means for concurrently exposing a photographic film and recording an intelligence signal and for concurrently projecting the images formed on the film while playing back the recorded signal.

Another object of the present invention is to provide a camera having means for recording an intelligence signal on a magnetic sound track carried by the photographic film, which means are capable of operating as a reproducing means in playing back the recorded signal.

A further object of the present invention is to provide a camera-projector unit having a common magnetic transducer head and including separable plug and socket means to automatically condition the transducer head for use as a recording head when the camera unit is separated from the projector unit.

A still further object of the present invention is to provide a combination separable camera-projector apparatus having separate amplifier circuit means in the projector unit and the camera unit whereby the amplifier circuit means in the camera unit will operate as a preamplifier stage during projection operation.

Yet another object of the present invention is to provide in a camera-projector apparatus circuit control means in the camera including a manually rotatable adjustment knob on the outside of the camera casing with control means in the projector casing including a clutch receiving the adjustment knob in interlocked relation.

Many other features, advantages and additional objects of the present invention will become manifest to those versed in the art upon making reference to the detailed description which follows and the accompanying sheets of drawings in which a preferred structural embodiment of a camera-projector apparatus is shown by way of illustrative example only.

Figure 1:
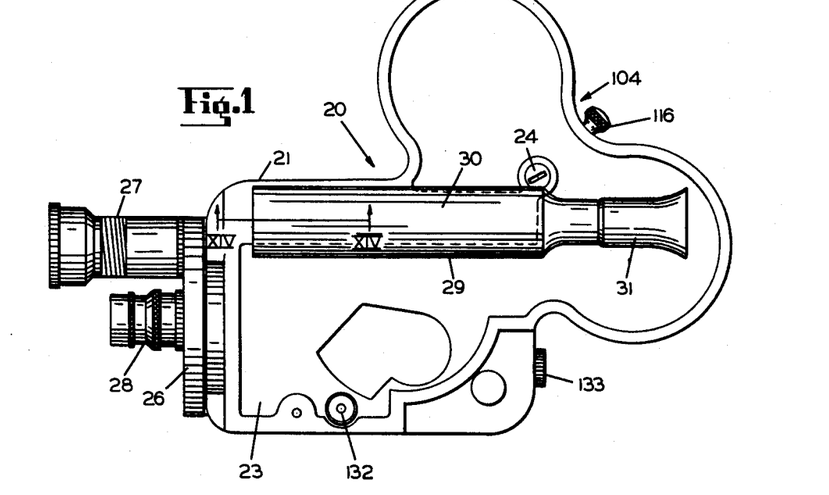
FIGURE 1 is an elevational view of a camera provided in accordance with the principles of the present invention.

Although the principles of the present invention find particular utility in connection with a combination camera-projector, it should be understood that the improvements described herein may be of general utility. In FIGURE 1 is shown a camera indicated generally at 20 having a casing 21 formed by a body member 22 and a cover 23 connected to the body member 21 by means of a light tight joint and suitable fastening means indicated, for example, at 24.

The body member 22 is of generally rectangular configuration and on the front end thereof is mounted a movable turret 26 carrying an optical lens system including a projection lens 27 and a camera lens 28.

As shown in FIGURE 1, the cover member 23 carries in firm assembly therewith a view finder 29 having a tubular body member 30 terminating at one end in an eye piece 31 and aligned on a sight projection axis generally parallel to the axis of the camera lens 28 and the projection lens 27 so as to be aligned generally in the direction of the camera objective. It will be appreciated that the view finder 29 is provided with the usual optical elements in order to form a miniature image of the camera objective exteriorly of the camera 20 for visual observation of the camera operator during actuation and operation of the camera 20.

Figure 5:
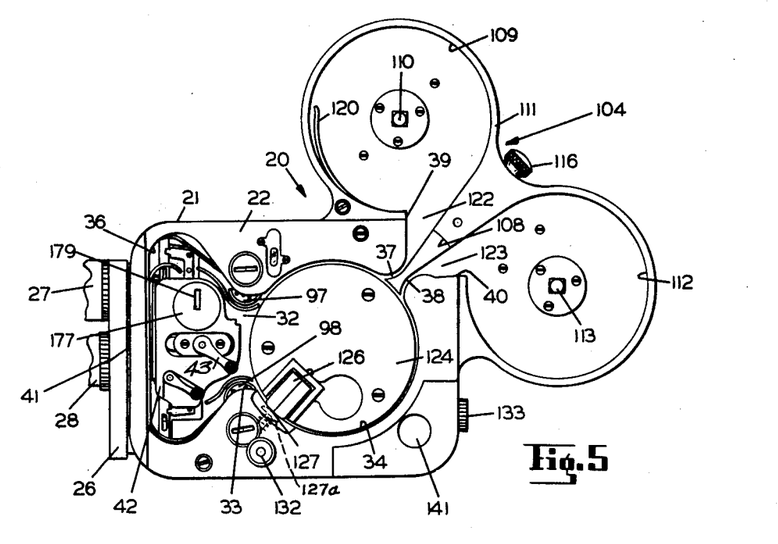
FIGURE 5 is a fragmentary elevational view generally similar to the view of FIGURE 1 but with parts removed to illustrate additional details of construction.
Figure 6:
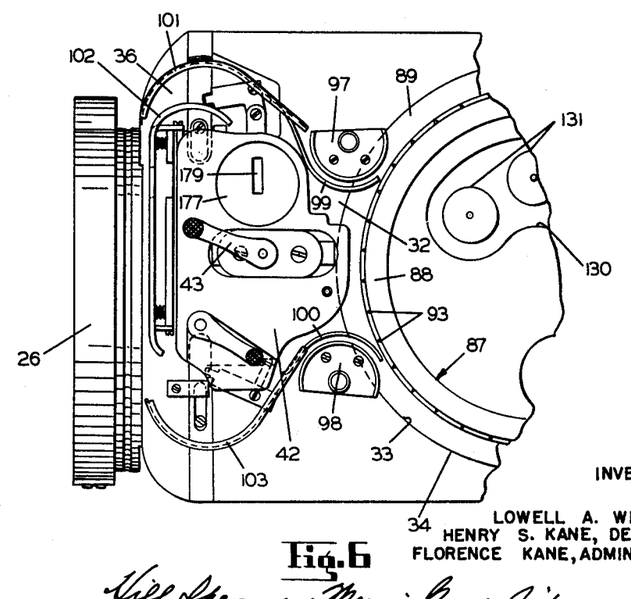
FIGURE 6 is a fragmentary enlarged elevational view similar to the view of FIGURE 5 but with parts broken away and with parts removed to illustrate additional details of construction.

As is particularly shown in FIGURES 5 and 6, the body member 22 of the casing 21 has one face thereof which is particularly characterized by an irregular shaped recess 32 of sufficient depth extending inwardly into the one side face of the body member 22 to provide peripheral walls 33 substantially coextensive in width with the width of a film medium. Recess 32 specifically includes a circular sprocket wheel cavity indicated at 34 which is offset slightly towards the bac kend of the body member 22 and which has forwardly thereof an enlarged loop forming cavity indicated at 36.

Extending rearwardly and upwardly of the sprocket wheel cavity 34, for example, in the upper right hand corner of the sprocket wheel cavity 34 as viewed in FIGURE 5, the body member 22 is provided with an inlet groove 37 and an outlet groove 38, the inlet groove 37 opening through the upper side of the casing 21 as at 39 and the outlet groove opening through an adjacent end wall portion of the casing 21 as at 40.

At the front end wall of the body member 22 indicated at 41, the loop forming cavity is provided with a straight wall portion in registry with the turret 26 and the associated optical lenses carried thereby. The usual film gate means is provided at such portion and cooperates with a selectively retractible pressure shoe 42 actuatable by a camming lever 43 in forward or rearward direction so as to permit the threading of a film medium around the upper and lower portions of the loop forming cavity 36 and through the film gate means.

Figure 17:
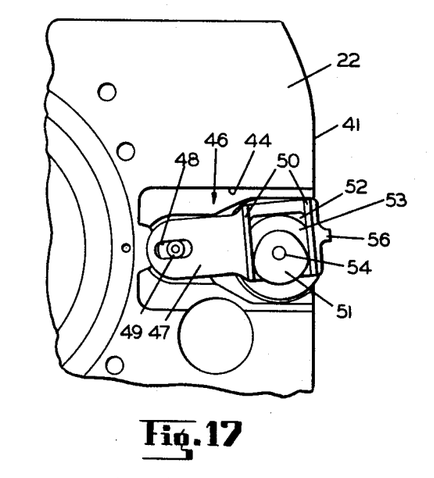
FIGURE 17 is a fragmentary elevational view with parts removed showing in greater detail the film transporting drive means of the present invention.

In the view of FIGURE 17 which shows the same side of the camera as that shown in FIGURES 5 and 6, however, with the pressure shoe 42 removed, it will be noted that a recess 44 receives a claw mechanism indicated generally at 46 and provided to advance the film intermittently through the loop forming cavity 36 and through the film gate means in proper relationship to the lenses carried by the turret device 26. The claw mechanism 46 includes a lever arm 47 slotted as at 48 to receive a pin 49, thereby to confine the lever member 47 for oscillatory movement.

A pair of parallel spaced ribs 50, 50 are provided on one face of the lever member 47 and cooperate with the camming surfaces provided by a rotatable eccentric cam member 51. Rotation of the eccentric cam member 51 will impart reciprocatory motion to the lever member 47 in a forward and rearward direction.

The lever member 47 is further provided with a recess 52 receiving a rotatable eccentric cam member 53 which is co-rotatable with the cam member 51 on a pin or shaft 54 and which operates to impart a reciprocatory motion to the lever member 47 in an up and down direction.

The lever member 47 is provided with a claw 56 which operates to engage the longitudinally spaced apertures provided along one side of a photographic movie film.

Figure 18:
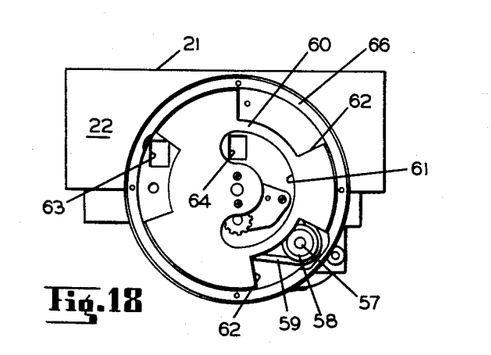
FIGURE 18 is a front end view of the camera of FIGURE 1 but with parts removed to show additional details of construction of the shutter mechanism.

It will be understood that the camera 20 of the present invention is also provided with the necessary shutter mechanism to obtain the intermittent action characteristic of movie cameras and movie projectors. The shutter mechanism is mounted on the front end of the camera casing 21 adjacent the end wall 41 and a sufficient detail for the understanding of the present invention is shown in FIGURE 18 wherein a rotatable motor drive shaft drives a pulley wheel 58 over which is trained a belt 59. The belt 59 is also trained over a pulley hub portion of a rotatable shutter 60 having a radially inwardly spaced semi-circular opening 61 adapted to provide the necessary intermit for photographically exposing a sensitive film emulsion upon operation of the apparatus as a camera unit and also including a plurality of circumferentially spaced recesses 62 arranged radially outwardly of the recess 61 at the periphery of the shutter 60.

For a purpose which will become manifest presently, it may be noted that the pulley wheel 58 comprises an overriding clutch assembly, having inner and outer ring members coupled by centrifugally responsive means.

As is clearly shown in FIGURE 18, the body member 22 is provided with a projection aperture 63 adapted to register with the recesses 62 and, upon proper setting of the turret mechanism 26 with the projection lens 27.

A camera aperture 64 is also provided which is spaced radially inwardly of the projection aperture 63 to register with the camera shutter opening 61 and, upon proper setting of the turret device 26 with the camera lens 28.

It will be understood that a support flange 66 surrounds the shutter 60 and provides a support mounting for the turret device 26. Suitable indexing apertures indicated at 67 cooperate with detent means (not shown) so as to index the turret device 26 with a definite seating action at various selected angular positions of adjustment.

Figure 7:
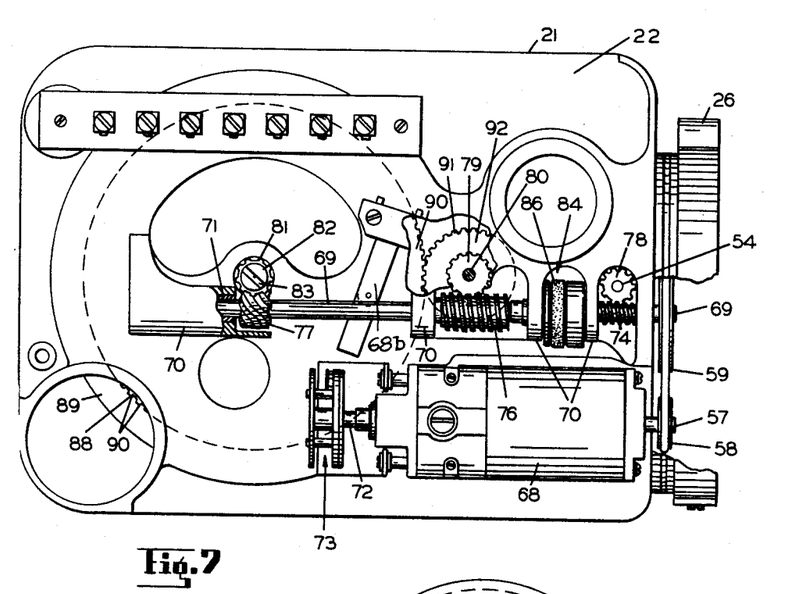
FIGURE 7 is a fragmentary elevational view with parts broken away and is generally similar to the view of FIGURE 2 but with parts removed in order to show additional details of construction.

As is more clearly shown on FIGURE 7, the body member 22 is recessed to receive an electric motor 68 having a power take-off shaft shown in FIGURE 18 by the reference numeral 57 for driving rotatively the shutter 60.

It may be noted that the shutter 60 is secured for rotation with a shaft 69 journalled for rotation in the body member 22 by a plurality of bearing housings 70 each having a bearing member as at 71 providing a bearing surface for journalling the shaft 69.

At the opposite end of the motor 68 is provided a stub shaft 72 carrying a governor control indicated generally at 73.

It will be noted that the shaft 69 is provided with three separate worm sections identified respectively at 74, 76 and 77.

The worm section 74 meshes with a gear member 78 attached in co-rotatable assembly with the pin or shaft 54 (FIGURE 17) thereby to provide a source of motive power for the claw mechanism 46.

The worm section 76 meshes with a gear 79 connected to an idler shaft 80 journalled for rotation in the body member 22 of the camera casing 21.

The worm section 77 meshes with a gear 81 connected to an idler shaft 82 having a coupling connection on the end thereof indicated at 83.

The reference numeral 84 indicates generally a shock absorbing mechanism which includes a rubber disc 86 to dampen the possible transmission of impulses from the claw mechanism.

When the motor 68 is operated, the shaft 69 will be driven to rotate the gears 78 and 79, however if motive means exteriorly of the camera 20 are coupled to the shaft 82 as at 83 in order to drive the shaft 69, the overriding clutch coupling 58 will operate to idle the motor 68 while permitting the operation of the gears 78 and 79 and the shutter 60.

Referring further to FIGURES 5, 6 and 7, it will be noted that the wheel sprocket recess 34 is provided with a wheel sprocket assembly indicated generally by the reference numeral 87.

Figure 19:
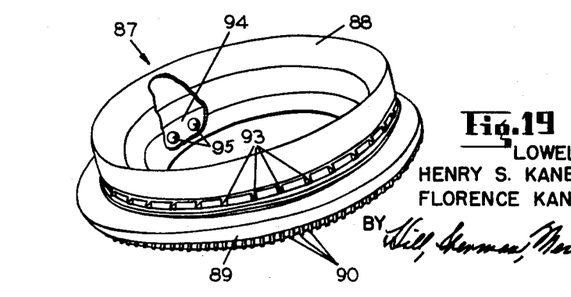
FIGURE 19 is an isometric view with parts broken away showing additional details of construction of the sprocket wheel assembly provided in accordance with the principles of the present invention.

The structural details of the wheel sprocket assembly 87 are shown in FIGURE 19 wherein it will be noted that an inner ring 88 and an outer ring 89 are provided, the outer ring 89 being stationarily mounted in the body member 22. On one side of the outer ring 89, the inner ring 88 is provided with circumferentially spaced gear teeth 90 which intermesh with the teeth 91 on a gear member 92 carried by the idler shaft 80.

On the other side of the outer ring member 89, the inner ring member 88 is provided with a plurality of circumferentially spaced sprocket teeth 93 which are adapted to lie in closely spaced relationship to diametrically opposite portions of the walls 33 and which are further adapted to engage the perforate tooth apertures provided in photographic movie film in accordance with conventional practice.

The inner and outer rings 88 and 89 together form an annular recess 94 which is filled with a suitable damping fluid, for example, a silicone fluid or a suitably viscous oil so that a damping drag will be imposed on the rotation of the inner ring 88.

The recess 94 also receives a plurality of shiftable bearing members taking the form of ball bearing members 95 which are interposed between the inner and outer rings 88 and 89 so as to establish rotating bearing contact therebetween.

By virtue of the relationship thus provided, film extending through the inlet groove 37 into the cavity 34 will be picked up by the teeth 93 on the sprocket assembly 87 and will pass over the top of the sprocket wheel assembly 87 towards the loop forming cavity 36.

Between the circular cavity 34 and the loop forming cavity 36, there is provided a restricted throat portion particularly characterized by the provision of upper and lower idlers indicated at 97 and 98 respectively. Spaced adjacent each of the idlers 97 and 98 is provided a guide member 99 and 100, respectively which are conformably shaped with respect to the loop forming recess 36 so as to direct the ingress and egress of the film in and from the loop forming recess 36. Thus, after leaving the upper portion of the sprocket assembly 87, the film is deflected by the guide member 99 towards the upper portion of the loop forming recess 36 whereupon guide members 101 and 102 will direct the film through the film gate means and to the bottom of the loop forming recess 36 whereupon a guide member 103 cooperating with the guide member 100 will again direct the film through the restricted throat between the loop forming recess 36 and the sprocket wheel recess 34 into engagement with the sprocket wheel assembly 87.

The upper and lower loop forming guide members 101 and 103 are lever means as shown in FIGURE 6 for automatically activating the guide members 101 and 103 inwardly when the pressure shoe 42 is retracted to its rearwardmost position. The film will be automatically threaded throughout the length of the film track when the parts are so arranged.

Upon moving the shoe 42 forwardly the guide members 101 and 103 will move outwardly, leaving properly formed loops in the film medium.

The film will leave the sprocket wheel recess 34 at the outlet groove 38.

As shown in FIGURES 1, 2, 5 and 8, a film magazine 104 is provided for the camera 20 and preferably includes a foot portion 106 arranged to rest on an adjacent top wall of the camera casing 21, a foot portion 107 which is disposed at substantially right angles to the foot portion 106 and which is adapted to engage a corresponding end wall of the camera casing 21 adjacent the top wall thereof, and a curved intermediate portion 108 conforming generally to the shape of the camera casing at the corner portion thereof.

Figure 8:
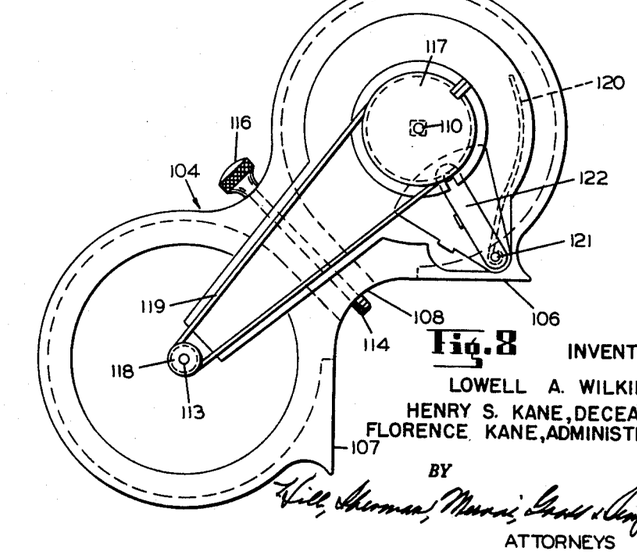
FIGURE 8 is a partial elevational view with parts removed showing additional details of construction of the film cartridge provided in accordance with the principles of the present invention.

The film magazine 104 includes a supply spool recess 109 having a supply spool shaft 110 rotatably journalled in a magazine body member 111 and further includes a take-up spool recess 112 having a take-up spool shaft 113 which is also journalled for rotation in the magazine casing member 111.

A fastening bolt 114 externally threaded and having a knurled manual adjusting knob 116 on one end thereof has its other end extending through the curve portion 108 for engagement in a threaded aperture provided in the camera casing 21.

As shown in FIGURE 8, the supply spool shaft 110 has attached thereto a pulley wheel 117. The take-up spool shaft 113 has a pulley wheel 118 attached thereto. The pulley wheel 118 is considerably smaller than the pulley wheel 117 and an endless belt 119 is threaded over the respective pulley wheels 117 and 118. A dust cover 120 encloses the pulley mechanism on the magazine casing.

It will be clear to those versed in the art that differences in rotational speed between the supply spool shaft 110 and the take-up spool shaft 113 will be accommodated by pulley slippage between the endless belt 119 and the respective pulley wheels 117 and 118, however, a difference in size between the pulley wheels 117 and 118 will result in the imposition of a continuous tension force on film which is nterconnected on a supply spool and a take-up spool carred on the respective shaft members 110 and 113.

The film magazine 104 is also provided with a footage indicator. As shown in FIGURES 5 and 8, a feeler finger 120 is pivoted on the pin 121 and is adapted to engage the film on a supply spool carried by a supply spool shaft 110 within the supply spool recess 109 of the film magazine 104.

An indicator lever arm 121 movable through a prescribed arc of movement outside of the film magazine 104 is indicated at 122. Suitable indicia means may be provided adjacent the lever arm 122 so as to indicate in suitably calibrated terms the amount of film remaining on the supply spool.

The film magazine 104 is so constructed that the body member 111 provides an opening 122 for the supply spool recess 109 in registry with the inlet groove 37 and also provides an opening 123 in registry with the outlet groove 38 when the magazine 104 is assembled on the body member 22 of the camera casing 21. The two parts may be placed in firm assembly by threading the end of the fastener 114 into a suitable threaded aperture provided in the body member 22, thereby aligning the supply and take-up spools carried by the respective shaft members 110 and 113 on a common center line axis inclined at an angle of 45° with respect to the camera casing 21.

Referring particularly to FIGURE 5, it will be noted that a base plate 124 in firm assembly with the body member 22 is received in the circular recess 34 and carries an electromagnetic transducer head 126 providing an air gap 127 adjacent the film track established between the walls 33 and the lowermost portion of the sprocket wheel assembly 87, thereby to establish a magnetic field through which a magnetizable sound track on a photographic film medium may be moved. A spring biased pressure shoe 127a is provided opposite the head 126, thereby providing a portion of the film track therebetween. In this connection, reference may be made to FIGURE 20 wherein is shown a fragmentary view of a commercially available llm medium comprising a photographic film 127 having a plurality of sprocket apertures 128 along one margin thereof and having a magnitizable sound track 129 adjacent the other margin thereof. It will be understood that the magnetizable sound track 129 can take any well known form of paramagnetic material held on the film 127 by a suitable adhesive.

Circuit means including amplifier circuit means are provided within the camera casing 21 and are electrically connected to the electromagnetic transducer heads 126. For example, as shown in FIGURE 6 a crescent shaped recess 130 provides clearance for laterally extending vacuum tubes 131 forming a part of the amplifier circuit means connected in circuit with the transducer head 126. As shown in FIGURES 1 and 5 a microphone jack 132 is provided on the camera casing 21 thereby to provide terminal connections for transmitting an intelligence signal to the transducer head 126 via the amplifying circuit means in the camera casing 21. It will be understood, of course, that an intelligence signal will be provided in accordance with conventional practice, for example, by means of a microphone or some other form of electrical pick-up.

A manually rotatable adjustment knob 133 is provided on the outside of the camera casing 21 and operates to control an adjustable resistance in the amplifier circuit means so as to selectively vary the intensity of the magnetic field established in the air gap 127, thereby to control the recording level.

Figure 14:
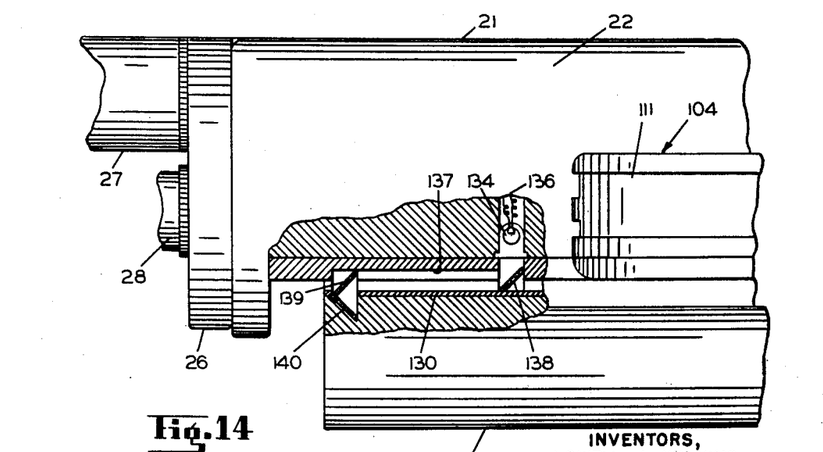
FIGURE 14 is an enlarged fragmentary plan elevational view with parts broken away and with parts shown in cross-section generally similar to the view of FIGURE 3.

Referring particularly to FIGURE 14 it will be noted that an excitation light source 134 is provided which operates as a point source responsive to the intensity of the magnetic field, suitable conductors indicated at 136 being provided to place the excitation light source 134 in circuit with the amplifying circuit means.

Optical means are also provided to transmit light from the light source 134 to the view finder 29. In this connection, means providing a passageway 137 extend between the excitation source 134 and a point adjacent the end of the view finder 29. A first mirror 138 is provided to change the direction of the rays of light emanating from the excitation source 134 and a pair of angularly related mirrors 139 and 140 respectively are provided to again change the direction of the rays of light reflected by the mirror 138 so that the light transmitted from the excitation source 134 will be superimposed on a portion of the miniature image formed by the view finder 29, thereby to provide a visible signal of the recording level which can be observed by the camera operator concurrently with his observation of the camera objective through the view finder 29.

In operation, the camera 20 will be held up to the eye level of the operator so that the eye piece 31 will be in register with one of the eyes of the operator and in this position the angularly inclined film magazine 104 will operate as a supplementary support means. The adjustment knob 133 will be readily accessible to the operator and while viewing the miniature image of the camera objective formed in the view finder 29, the operator will have a continuous visible signal indication of the recording level appearing in the mirror 140, which recording level may be subject to continuous adjustment through manipulation of the adjustment knob 133.

Because of the provision of the sprocket wheel assembly and the relative location of the transducer head 126 with respect to the film transporting means provided through the cooperation of the sprocket assembly 87 and the claw mechanism 46, the film medium 127 will be moved through the magnetic field established at the air gap 127 with substantially uniform velocity, the damping action between the inner and outer rings 88 and 89, respectively, of the sprocket wheel assembly 87 operating to minimize any pulsating action or jerky movements of the film.

In connection with the present invention, means are also provided to accommodate optical excitation light means as at 141 (FIGURE 5) in the event that the camera 20 is to be employed with a sound track of the photosensitive type.

Figure 20:
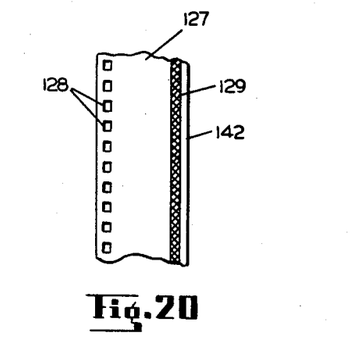
FIGURE 20 is a fragmentary elevational view of a motion picture film which can be effectively utilized in connection with the camera-projector apparatus of the present invention.

For example, in the film medium 127 shown in FIGURE 20, the sound track 129 comprises a strip of magnetizable material held on the film 127 by a suitable adhesive. It is also contemplated within the scope of the present invention to further provide an optical sound track on the margin of the film 127 for example, as at 142.

With such an arrangement, the recordation of an intelligence signal on the film 127 could be selectively effected either by magnetic recording or by the transmission of an intelligence signal to the optical recording means 141, whereupon the intelligence signal would be manifested as a controlled variable light intensity for exposure of a suitable light sensitive emulsion forming the optical sound track 142 on the film 127.

Figure 15:
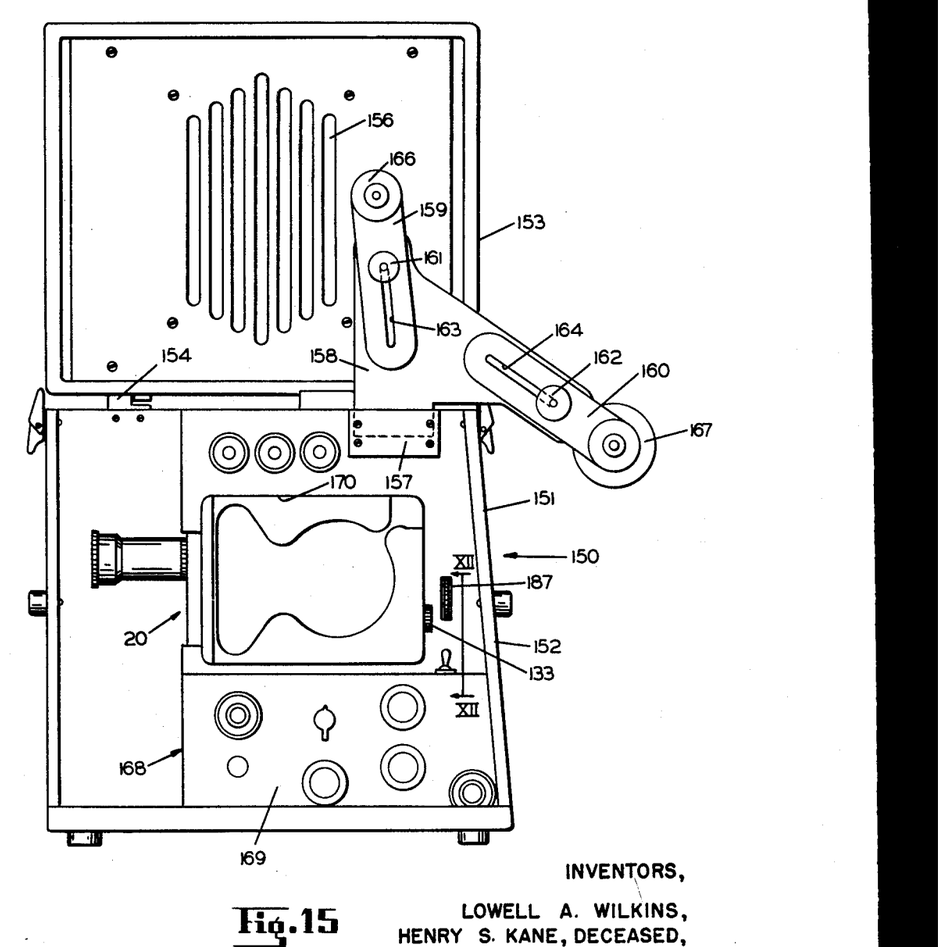
FIGURE 15 is an elevational view of the camera and projector in assembly.
Figure 16:
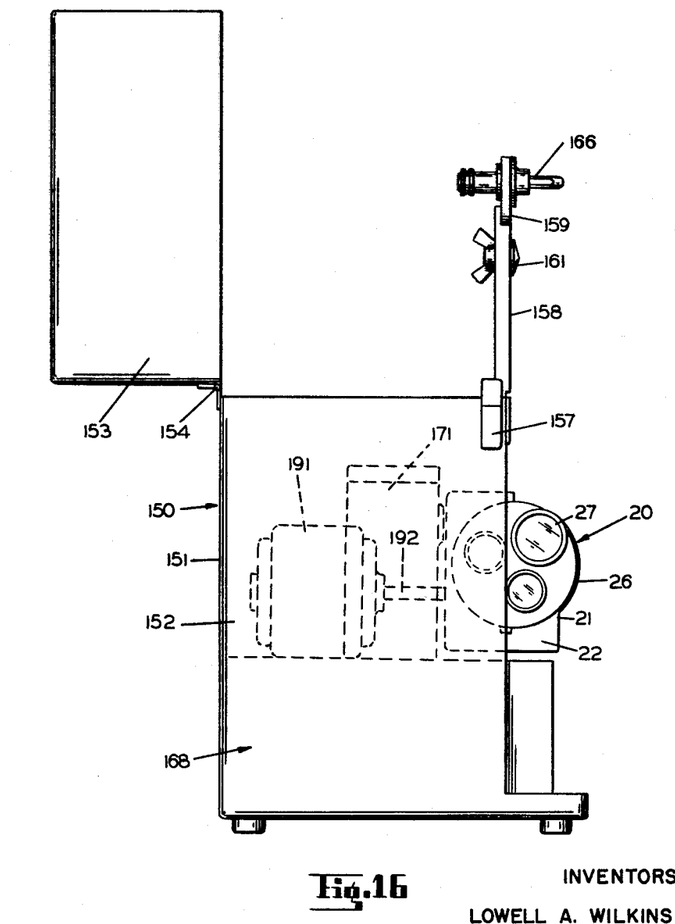
FIGURE 16 is a front end view of the camera-projector shown is FIGURE 15.

Referring now to FIGURES 15 and 16, it will be noted that there is provided a projector unit indicated as generally including a projector casing 151 including a body portion 152 and a cover 153 hingedly connected to the body portion 152 by a hinge connection indicated at 154.

The cover 153 conveniently houses a speaker 156 (FIGURE 15) and the body portion 152 is provided with a suitable pocket receptacle 157 to seat and lock a spool arm 158 having an adjustable supply arm 159 and an adjustable take-up arm 160.

The spool arm 158 carries fastening knobs indicated at 161 and 162 respectively and the arms 159 and 160 are slotted as at 163 and 164 respectively so as to permit relative adjustment of the arms 159 and 160 with respect to the spool arm 158 whereupon each of the fastening knobs 161 and 162 may be drawn up against the arms 159 and 160 to lock the arms in selected adjusted positions.

At the ends of the respective arms 159 and 160 are provided rotatable spool mounts 166 and 167 respectively for receiving a supply spool and a take-up spool (not shown).

The projector unit 150 is provided with circuit means including an amplifying circuit means indicated generally at 168, the various controls for the amplifying circuit means and the projector unit 150 being provided on a control panel 169.

The projector unit 150 is further provided with means establishing a recess on one face thereof indicated at 170 and shaped to conform to the configuration of the camera unit 20 whereupon the camera unit 20 may be selectively mounted in firm assembly with the projector unit 150 or selectively removed therefrom for independent use as a camera.

To adapt the camera unit 20 for insertion into the projector unit 150, the cover member 23 is removed as well as the film magazine 104.

Figure 9:
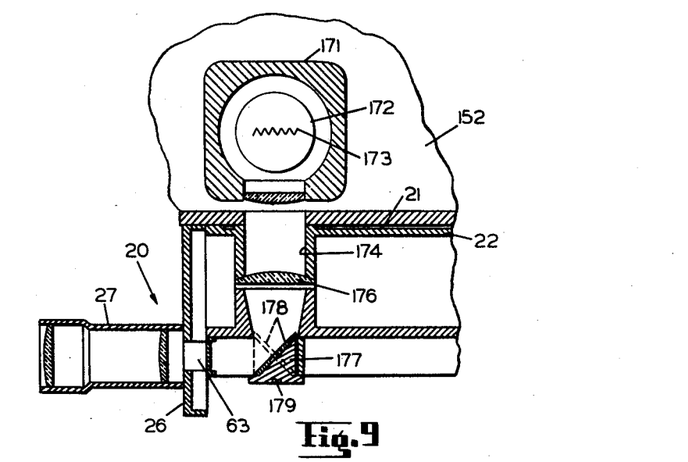
FIGURE 9 is a fragmentary cross-sectional view somewhat diagrammatic in character showing the arrangement of the light source in the projector casing and the adjustable mirror for controlling the transmission of light therefrom through the projection lens of the camera unit.

As is clearly shown in FIGURE 9, the projector unit 150 is further provided with a light source means 171 including an incandescent bulb 172 having a filament 173 which will emit rays of light through the side wall of the projector unit 152 towards the camera unit 20. The body member 22 of the camera casing 21 is provided with an aperture 174 closed by a lens 176 admitting the rays of light into the camera body 22 towards an adjustable mirror indicated at 177.

The turret mechanism 26 is adjusted so that the projection lens 27 registers with the projection aperture 63 and the mirror 177 is provided with a reflective surface 178 which changes the direction of the light transmitted from the light source means 171 90°, thereby directing the light rays through the projection aperture and through the projection aperture 63 and the lens 27.

The mirror 177 is adjustable between the full line position shown in FIGURE 9 and the dotted line position shown in FIGURE 9 so as to control the transmission of light through the passageway formed between the turret device 26 and the light source means 171. To effect this end, a slot 179 is provided in the face of the mirror 177 so that the mirror 177 can be conveniently turned between its alternative positions.

Figure 10:
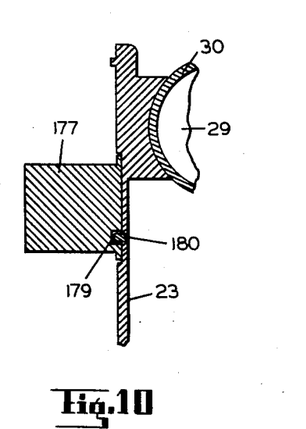
FIGURES 10 and 11 are fragmentary cross-sectional views showing the interlock between the adjustable mirror and the camera casing cover, FIGURE 10 showing the cover closed and FIGURE 11 showing the lens adjusted in such position that assembly of the cover is blocked.
Figure 11:
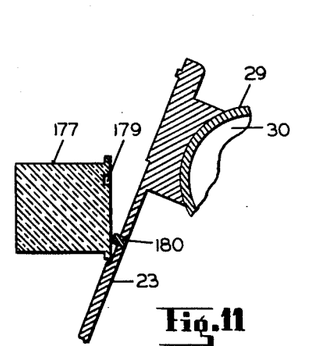

The slot 179 develops a further useful function as is depicted in FIGURES 10 and 11 since it will be evident that the mirror 177 should be in the dotted line position of FIGURE 9 whenever the camera is used independently for photographing subject matter. Under such conditions, it is necessary to attach the cover 23 to the camera. Accordingly, the cover 23 is provided with a mating lug 180 which is adapted to be seated and received in the slot 179 only when the mirror 177 is in the dotted line position of FIGURE 9.

In FIGURE 10, the cover 23 is shown with the locating lug 180 seated in the groove 179 of the properly aligned mirror 177. In FIGURE 11, however, the mirror is shown positioned in the full line position of FIGURE 9 and, accordingly, in this position of alignment, intermating detent action of the lug 180 and the groove 179 will block mounting of the cover 23 on the body member 22 of the camera casing 21.

Figure 2:
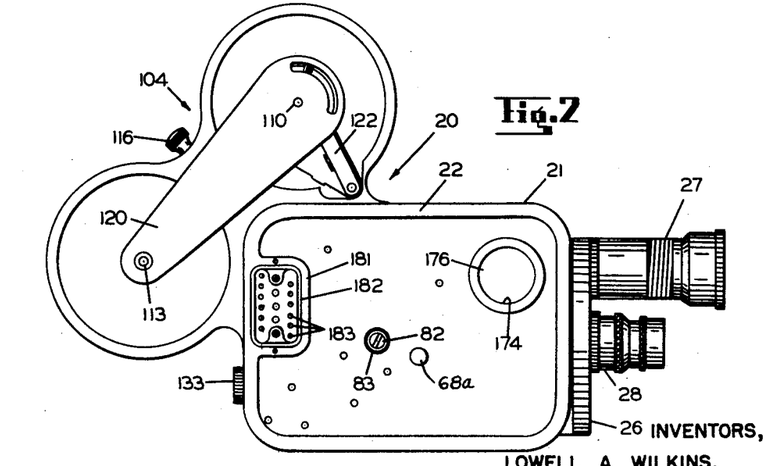
FIGURE 2 is an elevational view of the camera provided in accordance with the principles of the present invention, but showing the opposite side thereof.

As shown in FIGURE 2, the side of the body member 22 on the camera 20 adapted to be received against the projector unit 150 is provided with a terminal block 181 carrying a socket member 182 having a plurality of contact terminal members or contact members 183.

Figure 21:
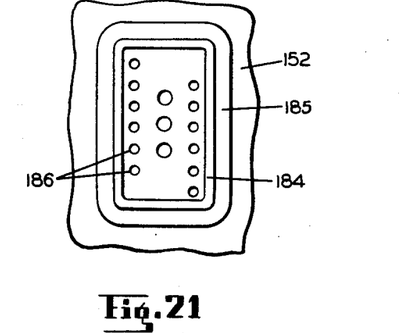
FIGURE 21 is an enlarged fragmentary elevational view showing one of the plug and socket components as provided on the projector casing to cooperate with the corresponding plug and socket unit on the camera shown at 181—183 of FIGURE 2.

As shown in the fragmentary view of FIGURE 21, the projector unit 150 is also provided with a terminal block 185 having a plug member 184 provided with a plurality of terminal connections or terminal contact members 186.

The terminal connections 186 and 183 intermate so as to place the amplifier circuit means 131 and the electromagnetic transducer head 126 in a circuit connection with the electrical circuit means of the projector unit 150. By virtue of such provision, a recorded signal on the sound track of a film may be transmitted from the transducer head 126 to the amplifier circuit means 168 in the projector unit 150 by way of the amplifier circuit means 131 in the camera unit 20 so that the amplifier circuit means 131 in the camera unit 20 will operate as a pre-amplification stage.

Figures 12, 13:
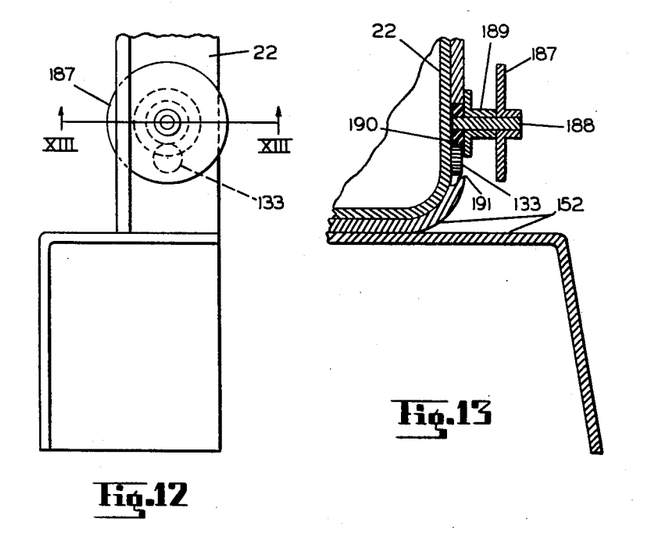
FIGURE 12 is a fragmentary cross-sectional view taken substantially on line XII—XII of FIGURE 15.
FIGURE 13 is a fragmentary partial cross-sectional view taken substantially on line XIII—XIII of FIGURE 12.

Control means are provided on the projector casing 151 and include a rotatable adjustment knob 187 adjacent the rear end of the camera unit 20 when the camera unit and the projector unit are assembled together. The adjustment knob 187 as shown in FIGURES 12 and 13 rotates on a shaft 188 journalled in a bushing 189 and the end of the shaft is provided with a rotatable rubber clutch member 190 adapted to engage the knurled peripheral surface of the manual adjustment knob 133 of the camera unit 20.

A recess 191 is provided in the wall portion of the projector body member 152 so that the knob 133 and the rubber clutch member 190 may be effectively interengaged with one another upon assembly of the camera unit 20 in the projector unit 150.

Figure 22:
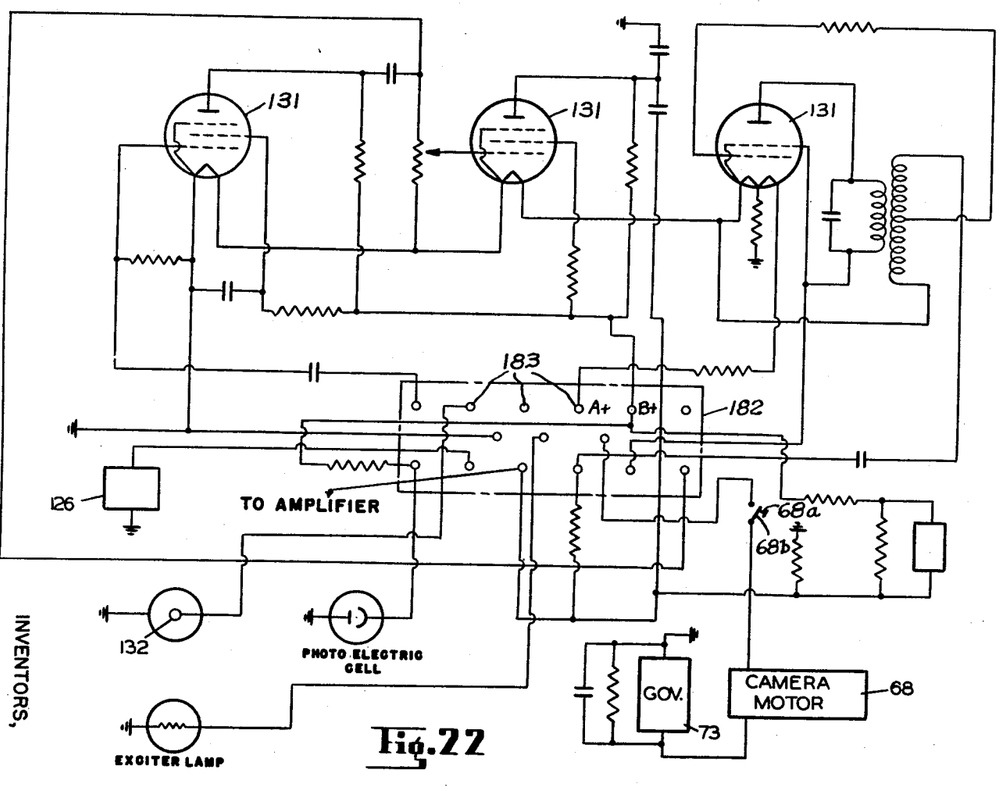
FIGURE 22 is a circuit diagram showing the electrical interconnection between the electrically energized components of the camera-projector apparatus of the present invention.

In FIGURE 22, the circuit connections for the camera-projector apparatus are shown in diagrammatic form. The camera motor 68 is shown in circuit with the governor 73 and it will be noted that this view also shows the microphone jack 132 for transmitting an intelligence signal to the electromagnetic transducer head 126.

It will be appreciated that the camera unit can be readily utilized as a magnetic recorder without effecting photographic exposure since a magnetic tape medium may be fed through the unit as explained above.

It should be further noted that the projector unit 150 is provided with a separate electric motor 191 having a power take-off shaft 192 adapted to be selectively coupled as at 83 to the shaft 82 of the camera unit 20 when the camera unit 20 is assembled with the projector unit 150 (FIGURE 16).

Figure 3:
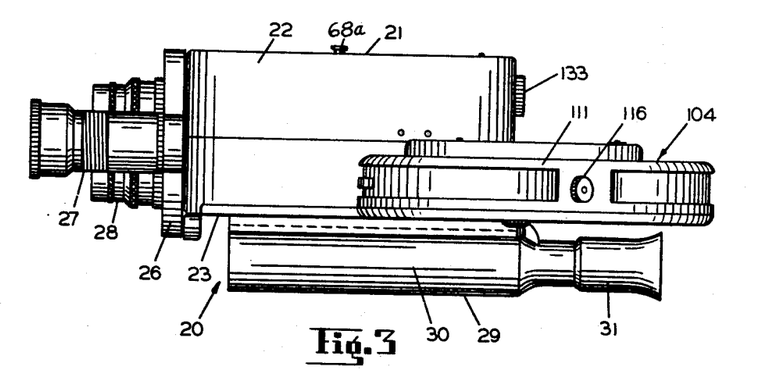
FIGURE 3 is a plan elevational view of the camera shown in FIGURES 1 and 2.
Figure 4:
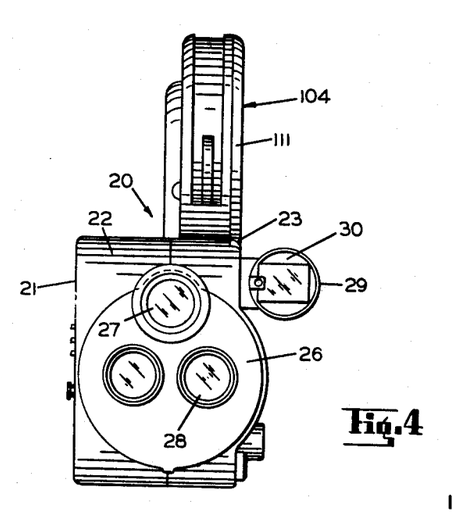
FIGURE 4 is a front end elevational view of the camera shown in FIGURES 1, 2 and 3.

As shown in FIGURE 3, an actuating button 68a is provided to operate the camera motor 68. The button 68a actuates a leaf switch 68b (FIGURE 7). The cam surface on shaft 69 cooperates with the button 68a to keep the leaf switch 68b depressed until the shutter 60 (FIGURE 18) is positioned to interrupt the light passing through the camera lens 28.

Referring further to FIGURE 22, it will be noted that one of the terminal connections 183 has an arrow labeled "to amplifier" indicating the part of the outgoing signal to the circuit means 168 of the projector unit. It will be understood, of course, that the projector unit circuit means can take any conventional form and the details thereof are unnecessary to the understanding of the present invention.

Although minor modifications might be suggested by those versed in the art it should be understood that we wish to embody within the scope of the patent warranted hereon all such modifications as reasonably and properly come within the scope of our contribution to the art.

We claim as our invention:

1. A selectively separable motion picture camera-projector apparatus comprising a camera unit and a projector unit for use when separated as a camera and when interconnected as a projector, comprising, separate camera and projector housing members removably interconnected with one another, a film track and film-advancing means in said camera housing member for operation common to both uses of the apparatus, a magnetic transducer head in said camera housing to establish a magnetic field adjacent said film track means, separate circuit means in each of said housings including separate amplifier circuit means adapted to be in circuit with said transducer head, circuit means to provide a separate energy source for said camera unit and for said projector unit, respectively, including plug and socket means on said housing having mating contact members effecting a switching action upon interengagement and separation to condition said transducer head for use as a recording head in said camera unit and conditioning said transducer head for use as a play-back head in said projector unit, circuit control means in said camera means including a manually rotatable adjustment knob on the outside of said camera member, and control means on said projector member including a clutch receiving said adjustment knob in interlocked relation.

2. A removably connected camera unit and projector unit for exposing and projecting motion pictures having in common optical and film-advancing means, and circuit means including a single transducer head in said camera unit for establishing a magnetic field adjacent the film-advancing means for recording when said camera unit it separated from said projector unit, and plug and socket connections between said camera and projector units conditioning said transducer head for play-back when said camera and projector units are interconnected, circuit control means in said camera unit including a manually rotatable adjustment knob on the outside of said camera unit, and control means on said projector unit including a clutch receiving said adjustment knob in interlocked relation.

3. In combination, for use with a photographic film medium having a magnetic sound track thereon, a motion picture camera unit for forming successive images on the photographic film medium, a projector unit for projecting the film images onto a viewing screen, film-transporting means in said camera unit operable in common to both of said units, and providing an air gap adjacent to which the sound track of the film is transported, and circuit means common to both units including an electromagnetic transducer head in said camera unit for establishing a magnetic field in the area of said air gap, thereby to selectively record and play-back an intelligence signal on the sound track, said circuit means including amplifier circuit means having a gain control adjustment knob on the outside of said camera unit, and control means in said projector unit including means to drivingly receive said adjustment knob in interlocked relation.

4. A combination as defined in claim 3 wherein said camera unit and said projector unit are selectively separable and include circuit means particularly characterized by a separable plug and socket having contact members engageable and separable to automatically condition said electromagnetic transducer head for use as a recording head when said camera unit is separated from said projector unit and for use as a play back head when said units are interconnected.

5. A combination motion picture camera-projector apparatus comprising a projector casing having amplifying circuit means therein, a separable camera unit having film transporting means therein and including a magnetic transducer head in said camera unit establishing a magnetic field through which a magnetic sound track on a film is moved for recording in said camera unit, circuit means in said camera unit including separable mating terminal connections between said projector casing and said camera unit for transmitting a recorded signal from said head to said amplifying means for play-back, and gain control means including a separate gain control adjustment knob on said camera unit and means in said projector unit drivingly receiving said gain control knob in interlocked relation.

6. A combination motion picture camera-projector apparatus as defined in claim 5 and separable terminal connections on said camera unit for transmitting an intelligence signal to said head for recording magnetic sound track.

7. A combination motion picture camera-projector apparatus as defined in claim 5 and circuit means in said camera unit to supply an amplified intelligence signal to said head for recording the signal on the magnetic sound track when the camera unit is used for recording and cooperating as a pre-amplifier stage with said amplifying means in said projector casing and transmitting a recorded signal from said head to said amplifying means when said camera unit is interconnected with said projector casing.

8. A combination camera-projector apparatus comprising a projector casing, circuit means in said projector casing including projector amplifier circuit means, an electric projector motor having a rotatable power take-off shaft extending to one side of said casing, electric light source means in said projector casing arranged to emit rays of light outwardly of said one side of said casing, and means providing a recess in said one side of said casing, a camera casing removably received in said recess, circuit means in said camera casing including camera amplifier circuit means, lens means in said camera casing to form an image for photographing and to project an image when projecting, mirror means in said camera casing selectively registering with said lens means and said light source means to transmit light from said light source means in changed direction through said lens means, film transporting means in said camera casing to move film with respect to said lens means and including an electromagnetic transducer head in said camera casing to establish a magnetic field through which a magnetic sound track on the film may be moved, said circuit means in said camera casing including terminal connections on said camera casing to transmit an intelligence signal through said camera amplifier circuit means and to said head for recording the signal on the film sound track, an electric camera motor in said camera casing having a drive connection with said film transporting means, a terminal block on said camera casing, terminal connections on said terminal block to transmit electric energy from an outside source to said motor and to said circuit means, said drive connection comprising an overriding clutch and including means to concurrently inactivate said camera motor in said camera casing and to effect a drive connection between said power take-off shaft of said projector motor and said film transporting means when said camera casing is attached to said projector casing, a terminal block on said projector casing in register with said terminal block on said camera casing, intermating terminal connections in said terminal blocks to transmit a recorded signal from said head through said camera amplifier means in said camera casing and to said projector amplifier means in said projector casing, whereby the recorded signal will be preamplified, circuit control means in said camera means including a manually rotatable adjustment knob on the outside of said camera casing, and control means on said projector casing including a clutch receiving said adjustment knob in interlocked relation.

9. In a camera-projector apparatus, a projector casing, a camera casing removably attached thereto, circuit control means including amplifier circuit means in said camera casing and further including a manually rotatable amplifier gain control adjustment knob on the outside of said camera casing, and amplifier gain control means in said projector casing including an adjustment means having a clutch receiving said adjustment knob in interlocked relation for simultaneous control when the camera casing is attached to the projector casing.

10. A combination camera-projector apparatus comprising a projector casing, circuit means in said projector casing including projector amplifier circuit means, an electric projector motor having a rotatable power take-off shaft extending to one side of said casing, an electric light source means in said projector casing arranged to emit rays of light outwardly of said one side of said said casing, and means providing a recess in said one side of said casing, a camera casing removably received in said recess, circuit means in said camera casing including camera amplifier circuit means, lens means in said camera casing to form an image for photographing and to project an image when projecting, film-transporting means in said camera casing to move film with respect to said lens means and including an electromagnetic transducer head in said camera casing to establish a magnetic field through which a magnetic sound track on the film may be moved, said circuit means in said camera casing including terminal connections on said camera casing to transmit an intelligence signal through said camera amplifier circuit means and to said head for recording the signal on the film sound track, an electric camera motor in said camera casing having a drive connection with said film transporting means, a terminal block on said camera casing, terminal connections on said terminal block to transmit electric energy to said motor and to said circuit means and to transmit a recorded signal from said head through said camera amplifier means in said camera casing and to said projector amplifier means in said projector casing, whereby the recorded signal will be preamplified, and circuit control means in said camera means including a manually rotatable adjustment knob on the outside of said camera casing, and control means on said projector casing including means drivingly receiving said adjustment knob in interlocked relation.

11. A combination camera-projector apparatus as defined in claim 10, said projector unit motor and said camera unit motor each having a power take-off shaft, intermittent shutter means in said camera casing, said camera motor take-off shaft having a drive connection with said film transporting means and said shutter means and including an overriding clutch operatively engageable with said power take-off shaft of the projector motor to concurrently inactivate the camera motor and effect a driving connection between the take-off shaft of said projector motor and the film transporting means and the shutter means when the camera casing is attached to the projector casing.

12. A combination camera-projector apparatus comprising a light source in said projector casing, a lens turret on said camera casing including a camera lens and a projector lens, passage means provided by said camera casing between said lenses and a point in register with said light source when said camera and projector casings are attached to one another, an adjustable mirror in control of said passage means having one position of adjustment wherein said passage means is closed and having a second position of adjustment wherein light from said source will be transmitted through said projector lens.

13. A combination camera-projector apparatus as defined in claim 12, said camera casing having an open side, and a cover member for closing said open side, intermating detent means between said cover member and said mirror blocking assembly of said cover member to said casing whenever said mirror is in said second position of adjustment.

14. A combination camera-projector apparatus comprising a projector casing, circuit means in said projector casing including projector amplifier circuit means, an electric projector motor having a rotatable power take-off shaft extending to one side of said casing, electric light source means in said projector casing arranged to emit rays of light outwardly of said one side of said casing, and means providing a recess in said one side casing, a camera casing removably received in said recess, circuit means in said camera casing including camera amplifier circuit means, lens means in said camera casing to form an image for photographing and to project an image when projecting, film transporting means in said camera casing to move film with respect to said lens means and including an electromagnetic transducer head in said camera casing to establish a magnetic field through which a magnetic sound track on the film may be moved, said circuit means in said camera casing including terminal connections on said camera casing to transmit an intelligence signal through said camera amplifier circuit means and to said head for recording the signal on the film sound track, an electric camera motor in said camera casing having a drive connection with said film transporting means, a terminal block on said camera casing, terminal connections on said terminal block to transmit electric energy to said motor and to said circuit means, said drive connection comprising an overriding clutch and including means to concurrently inactivate said camera motor in said camera casing and to effect a drive connection between said power take-off shaft of said projector motor and said film-transporting means when said camera casing is attached to said projector casing, a terminal block on said projector casing in register with said terminal block on said camera casing, intermating terminal connections in said terminal blocks to transmit a recorded signal from said head through said camera amplifier means in said camera casing and to said projector amplifier means in said projector casing, whereby the recorded signal will be preamplified, circuit control means in said camera means including a manually rotatable adjustment knob on the outside of said camera casing, and gain control means on said projector casing including means to drivingly receive said adjustment knob in interlocked relation.

References Cited in the file of this patent

UNITED STATES PATENTS

| | | |
|---|---|---|
| 1,377,322 | De Tartas et al. | May 10, 1921 |
| 1,536,347 | Lovejoy | May 5, 1925 |
| 1,919,595 | Owens | July 25, 1933 |
| 2,027,680 | Debrie | Jan. 14, 1936 |
| 2,051,661 | Weber | Aug. 18, 1936 |
| 2,676,023 | Isom | Apr. 20, 1954 |
| 2,866,009 | Genning et al. | Dec. 23, 1958 |

FOREIGN PATENTS

| | | |
|---|---|---|
| 441,110 | Great Britain | Jan. 9, 1936 |